United States Patent [19]

Miyawaki

[11] Patent Number: 5,777,594

[45] Date of Patent: Jul. 7, 1998

[54] LIQUID CRYSTAL DISPLAY APPARATUS

[75] Inventor: Mamoru Miyawaki, Isehara, Japan

[73] Assignee: Canon Kabushiki Kaisha, Tokyo, Japan

[21] Appl. No.: 713,220

[22] Filed: Sep. 12, 1996

[30] Foreign Application Priority Data

Sep. 13, 1995 [JP] Japan .................................. 7-259582

[51] Int. Cl.[6] ............................................. G09G 3/36
[52] U.S. Cl. ............................. 345/102; 345/87; 349/161
[58] Field of Search ............................. 345/87, 88, 102; 349/161, 56

[56] References Cited

U.S. PATENT DOCUMENTS

| 5,177,577 | 1/1993 | Taniguchi et al. ...................... 257/59 |
| 5,317,433 | 5/1994 | Miyawaki et al. ...................... 359/59 |
| 5,364,433 | 11/1994 | Nishimura et al. ...................... 65/17.4 |
| 5,402,141 | 3/1995 | Haim et al. ...................... 345/88 |
| 5,510,918 | 4/1996 | Matsunaga et al. ...................... 359/88 |
| 5,513,028 | 4/1996 | Sono et al. ...................... 359/87 |
| 5,530,266 | 6/1996 | Yonehara et al. ...................... 257/72 |
| 5,539,552 | 7/1996 | Desai et al. ...................... 359/66 |
| 5,541,748 | 7/1996 | Ono et al. ...................... 359/59 |
| 5,597,223 | 1/1997 | Watanabe et al. ...................... 353/97 |
| 5,610,738 | 3/1997 | Sasano et al. ...................... 349/43 |

*Primary Examiner*—Richard A. Hjerpe
*Assistant Examiner*—Kent Chang
*Attorney, Agent, or Firm*—Fitzpatrick, Cella, Harper & Scinto

[57] ABSTRACT

A liquid crystal display device is provided in which has a flat color filter substrate, and realizes higher contrast and larger picture size. For this purpose, light-intercepting layer is formed on TFT substrate, back light is placed on the side of TFT substrate, and a heat-radiating plate for the back light is placed between the back light and the liquid crystal panel to intercept light onto the non-display region.

9 Claims, 5 Drawing Sheets

LIQUID CRYSTAL DISPLAY APPARATUS

BACKGROUND OF THE INVENTION

1. Field of the Invention

The present invention relates to a liquid crystal display for displaying characters and images by utilizing liquid crystals.

2. Related Background Art

In recent years, apparatuses for multimedia have been actively developed. In particular, liquid display devices are attracting attention for image displaying. View finders of video cameras and liquid crystal projectors have been commercialized.

FIG. 5 is a cross-sectional view of a conventional liquid crystal panel, which is a transmission type color display device driven by an active matrix employing thin film transistors (TFT) as an picture element switch and a peripheral drive circuit. In FIG. 5, TFT substrate 8 has, on a glass base plate, image-switching TFTs, each comprising gate 10 connected to a scanning line, sources 11 connected to a signal line, and a drain 12; picture element electrode 14 connected to drain 12, orientation film 15, and polarizing plate 16. On the other hand, counter substrate 1 has, on a glass base plate, color filters 4, common electrode 5, orientation film 6, polarizing plate 2. Liquid crystal layer 7 is held between counter substrate 1 and TFT substrate 8. The numeral 19 denotes a back light; 101, a black matrix; 24, a peripheral portion (non-displaying portion) including a peripheral drive circuit and a sealing portion; 25, a display portion; and 21, an observer.

Conventional liquid crystal panel 21 shown in FIG. 5 is viewed from the side of TFT substrate 8. Such a liquid crystal panel involves a problem that the ratio of image magnification by the optical system is not sufficient owing to a longer optical path from liquid crystal layer 7 in comparison with the one observed from the side of counter substrate 1.

Further, the liquid crystal panel shown in FIG. 5 has a black matrix 101 as the light-intercepting layer between adjacent color filters. Therefore, the overlapping of black matrix 101 with color filter 4 in the periphery of the displaying picture element causes level difference, which disturbs the liquid crystal orientation and deteriorates the displayed image. Therefore, a technique is desired for producing a flatter counter substrate surface.

Black matrix 101, which intercepts light irradiation to the peripheral circuit and the image-switching TFTs, may not be omitted. Attempts have been made to remove black matrix 101 from counter substrate 1 by providing a light-intercepting layer on the side of TFT substrate 8. However, the color filter 4 is not sufficiently adhesive to the substrate, therefore this arrangement is not reliable and not practical.

Furthermore, the display region of the picture element is defined by the aperture of black matrix 101 at the side of counter substrate 1. Since the precision of the positional registration of TFT substrate 8 with counter substrate 1 is limited, the aperture of black matrix 101 is made smaller to offset the positional deviation and to raise the production yield, which diminishes the brightness of the image display.

SUMMARY OF THE INVENTION

An object of the present invention is to provide a liquid crystal display device which does not have the above problems and is capable of producing images of high brightness and high contrast with a large picture area.

The liquid crystal display device of the present invention is a transmission type comprising a liquid crystal panel comprised of an active matrix substrate, a counter substrate, and a liquid crystal held therebetween; and a light source, wherein the active matrix substrate has a light-intercepting layer, a heat-radiating plate for the light source is placed between the light source and the liquid crystal panel to intercept light to non-displaying portion of the liquid crystal panel, and the light source is placed at the side of the active matrix substrate. Thereby the picture area can be extended and the disturbance of the orientation of liquid crystal is prevented.

According to the present invention, the aperture region of the picture element is defined by the light-intercepting layer provided on the active matrix substrate. Thereby the ratio of aperture region area can be increased independently of the positional registration of the substrates.

Further, in the present invention, the adhesion of the color filter to the substrate is strengthened by interposition of layer 9 between the color filter and the substrate.

The present invention is suitably applicable to a liquid crystal display device employing a TFT as the picture element switch. The present invention is applicable to not only a liquid crystal display device for color pictures but also a display device for black-and-white.

The liquid crystal display device of the present invention forms images with high contrast and high brightness without increasing of the size and weight of the apparatus, and realizes a larger picture display when employed for a head-mounting displaying. Further, use of a monocrystalline Si substrate realizes a finer image display at a lower cost with a smaller apparatus, without causing malfunction of the peripheral driving circuit.

DESCRIPTION OF THE PREFERRED EMBODIMENTS

Embodiment 1

Figure 1:
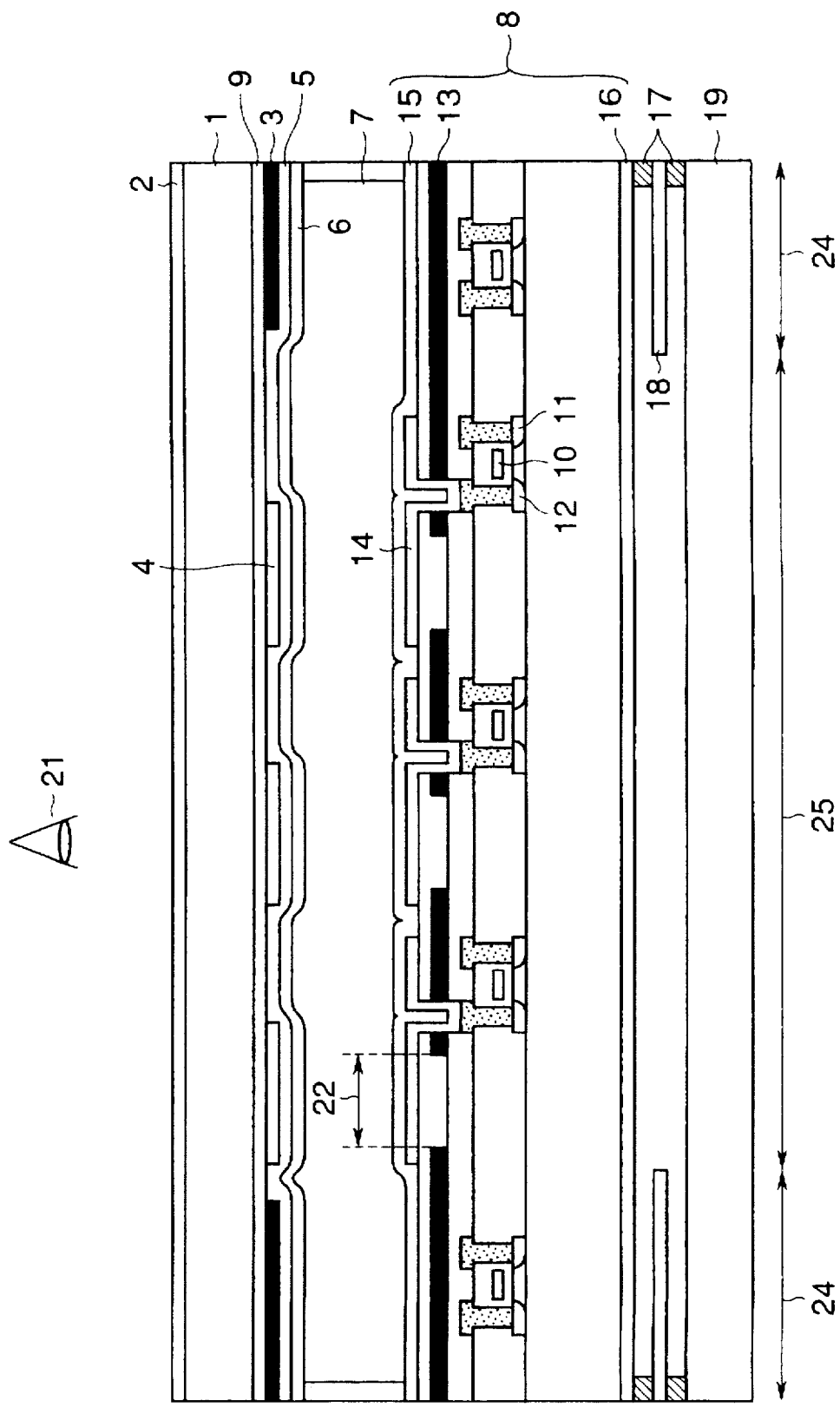
FIG. 1 is a cross-sectional view of a first embodiment of the present invention.

A first embodiment of the present invention is described by reference to FIG. 1 showing the sectional view thereof. This embodiment is a liquid crystal display device employing a TFT as the image switch and the peripheral driving circuit.

Figure 5:
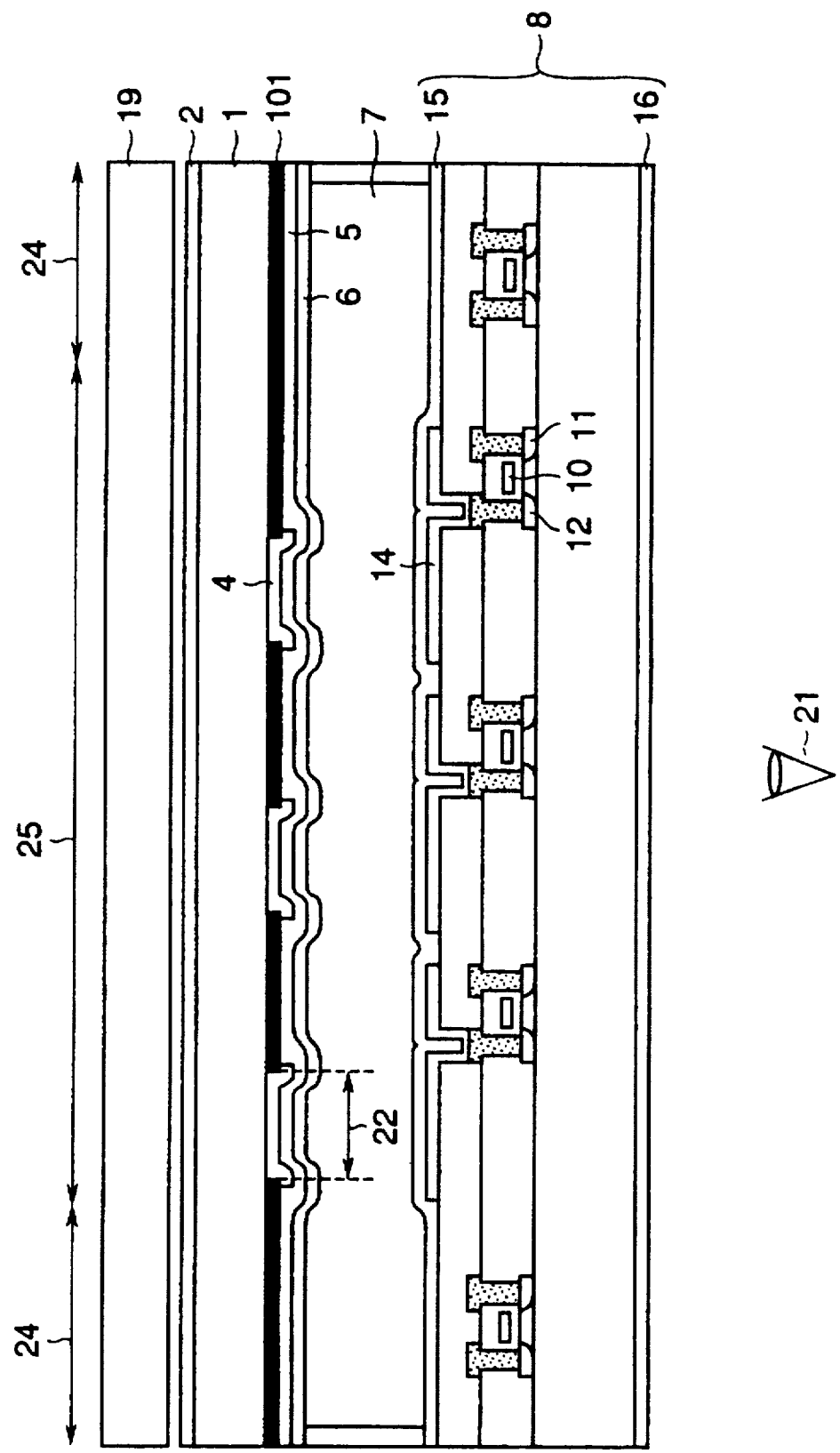
FIG. 5 is a cross-sectional view of a conventional liquid crystal panel.

In FIG. 1, the same member as in FIG. 5 is denoted by the same reference numeral. In FIG. 1, the numeral 3 denotes an alignment mark layer which can serve also for interception of light; 9, an $SiCH_3$ layer; 18, a heat-radiating plate for back light; 17, a jig for fixing back light 19 to the TFT substrate. In this embodiment, a flat plate type back light is employed. However, an LED (light emitting diode) light source of R(red), G(green), B(blue) may be used for the illumination.

Figure 2:
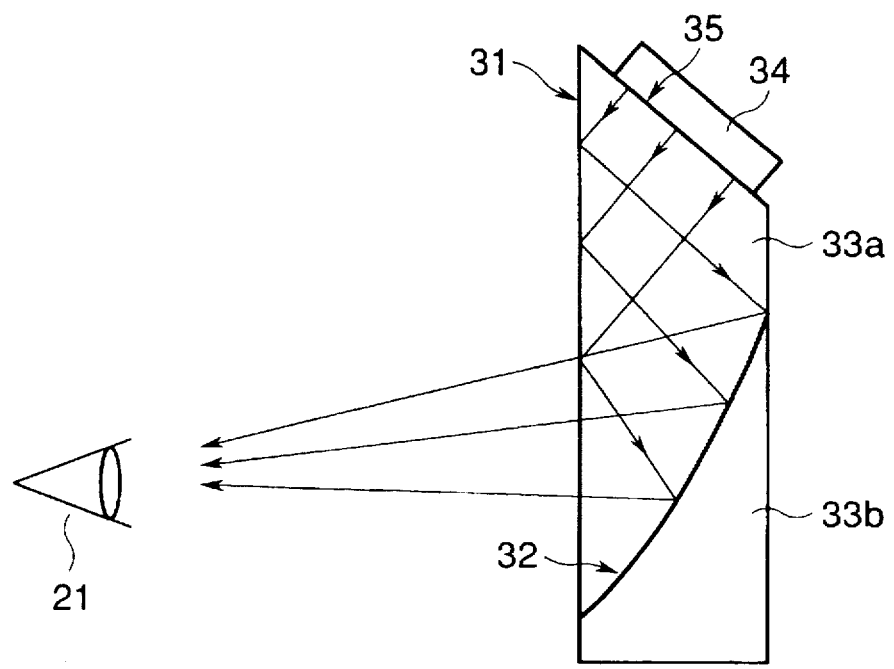
FIG. 2 is a schematic drawing of a head-mounting display according a first embodiment of the present invention.

In this embodiment, the observer 21 observes the displayed image from the side of counter substrate 1. Therefore, the optical path from liquid crystal 7 is shorter than that in a conventional one, and the enlargement ratio through the optical system is made higher. FIG. 2 shows an example of an optical system of a head-mount display in which a device of this embodiment is employed. In FIG. 2, the numeral 34 denotes a liquid crystal display device; 33a, a first optical member; 33b, a second optical member having a concave mirror 32 at the interface; and 31, a total reflection face of the first optical member 33a.

As shown in FIG. 2, the light from liquid crystal display device 34 is introduced into the first optical member 33a, reflected by total reflection face 31 and concave mirror 32, and viewed by observer 21. In this embodiment, since the optical path from liquid crystal layer 7 is shorter, a virtual image can be observed in a size of 30–50 inches to achieve a larger picture display.

In the liquid display device of the present invention, the peripheral drive circuit in the panel is protected from light by heat-radiating plate 18. Therefore, an additional light-intercepting layer is not necessary, which prevents an increase in the weight and size of the apparatus. Further, light-intercepting layer 13 is provided on TFT substrate 8 to play a role of a conventional black matrix, which allows omission of the black matrix. The surface of the counter substrate 1 is thereby flattened, defective orientation of the liquid crystal is prevented, and high contrast of the image can be achieved.

Color filters 4 are formed on layer 9 in this embodiment, thereby the adhesion of the color filter to the substrate is strengthened.

Since color filters 4 are arranged with intervals, slight positional deviation of the color filters of the respective colors does not cause overlapping with each other.

The peripheral portion of color filter 4, which is usually different from its center portion in film thickness and color characteristics, does not affect the image display since the aperture for the picture element is defined by light-intercepting layer 13 and the light is intercepted at the peripheral portion of the color filter. Therefore, the display characteristics are improved by the absence of the level difference to be caused by the black matrix and by the absence of the adverse effect of the peripheral portions of the color filters. Further, since the aperture regions are defined by the openings of light-intercepting layer 13, the apertures are formed independently of the positional registration of the substrates with a high aperture region area ratio to obtain a bright display.

Embodiment 2

Figure 3:
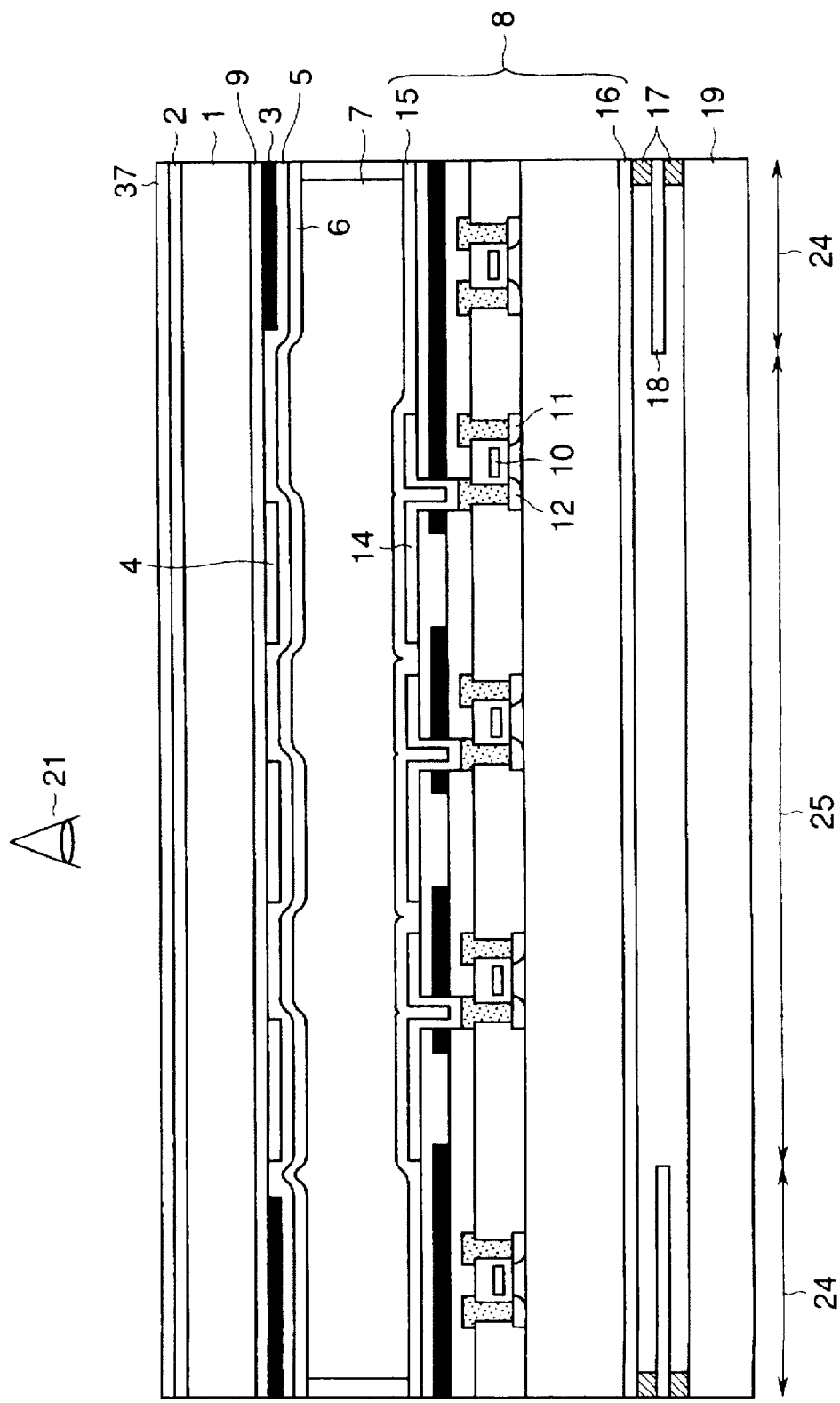
FIG. 3 is a cross-sectional view of a second embodiment of the present invention.

A second embodiment of the present invention is described by reference to FIG. 3 showing the sectional view thereof. In FIG. 3, the same member as in embodiment 1 is denoted by the same reference numeral.

This embodiment is characterized by reflection-preventing coating layer 37 provided on the external surface of counter substrate 1, and alignment mark layer 3 provided in non-display portion to prevent reflection of outside light. Observing person 21 observes not only the transmitted light from back light 19 but also the light introduced from the side of the observing person and reflected by the surface of counter substrate 1, in particular by non-display region 24, thereby the display is somewhat disturbed disadvantageously. However, the constitution of this embodiment realizes bright display with high contrast, even in the outdoors, by preventing the influence of the outside light, in particular the reflection at the non-displaying area.

Embodiment 3

Figure 4:
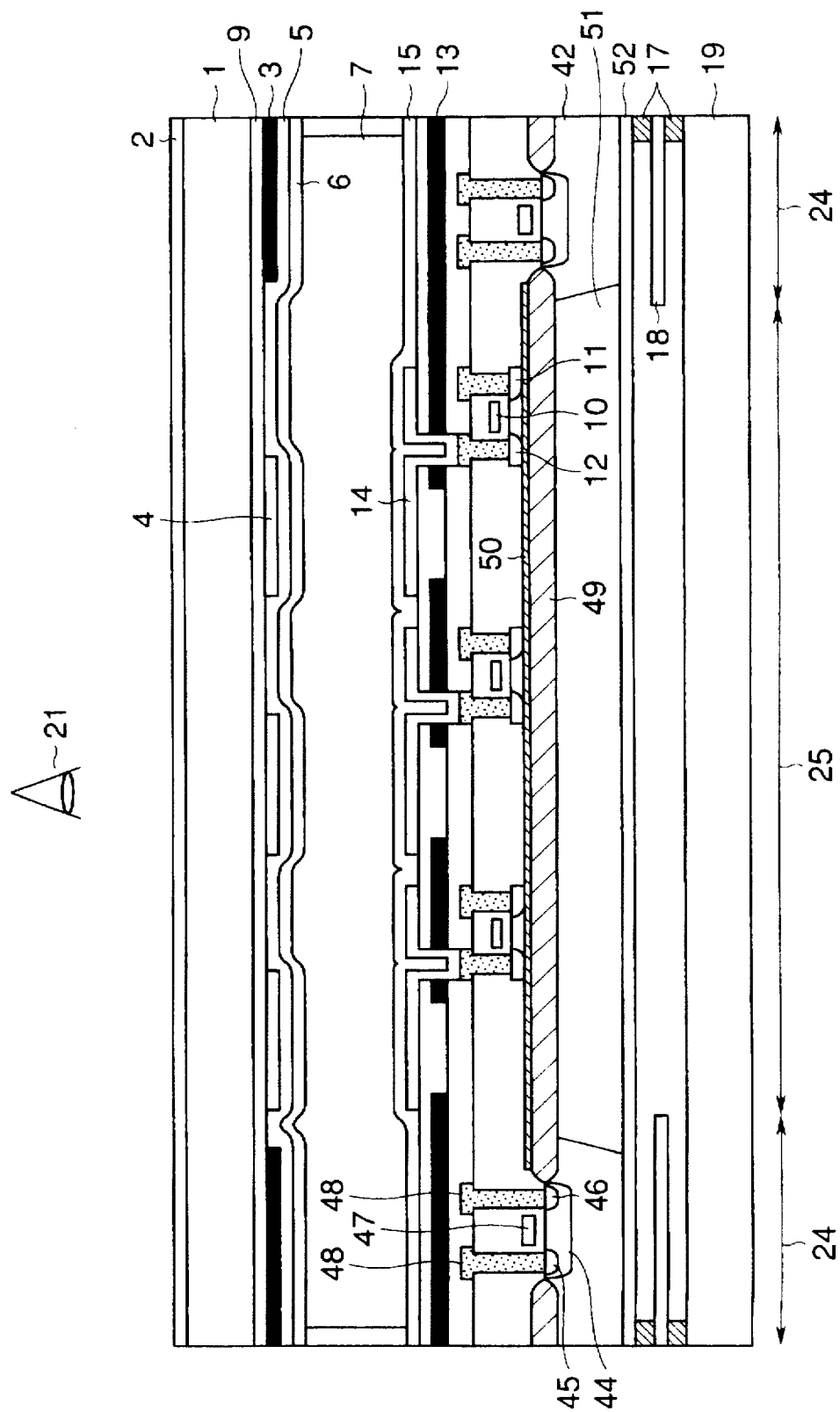
FIG. 4 is a cross-sectional view of a third embodiment of the present invention.

A third embodiment of the present invention is described by reference to FIG. 4 showing the sectional view thereof. In FIG. 4, the same member as in embodiment 1 is denoted by the same reference numeral.

This embodiment is characterized by a monocrystalline Si substrate as the active matrix substrate, monocrystalline Si transistors constituting the peripheral driving circuit, picture element switches constituted of a TFT substrate, and removal of monocrystalline Si from the display region for providing a transmission type display device. In FIG. 4, an n-type MOSFET is constituted of n-type Si substrate 42, p-type well layer 44, source 45, drain 46, gate 47, and source-drain electrodes 48. The peripheral driving circuit is preferably of CMOS constitution. A p-type MOSFET is also provided although not shown in FIG. 4. The numeral 49 denotes a thermal oxidation film; 50, a film constituted of Lp-SiN having tensile stress for forming a film on the display region and an oxidation film formed on the surface thereof; 51, a cavity formed by etching of Si substrate 42; and 52 a glass plate having a polarizing plate thereon.

In this embodiment, the material of counter substrate 1 is preferably the one having a thermal expansion coefficient approximate to that of Si, such as SD-2 (HOYA Corporation), and 7740 (Corning Co.).

In this embodiment, the display device realizes super-fine density of picture elements such as 1000 to 2000 elements per about 20 mm in a horizontal direction at high-speed driving owing to the peripheral driving circuit constituted of a transistor comprising monocrystalline Si. Further, use of monocrystalline Si enabled the transistor itself to be small in size.

The light introduced from the back light source 19 onto the monocrystalline Si substrate will generate carriers to cause malfunctioning of the peripheral driving circuit. In this embodiment, the peripheral driving circuit is protected from light by heat-radiating plate 18 for back light source 19 to solve the above problem. Furthermore, the Si substrate is less expensive than quartz substrate, and enables formation of finer peripheral driving circuit to miniaturize the chip, reduce the production cost, and decrease the size of the device.

What is claimed is:

1. A transmission-type liquid crystal display device comprising:
   a liquid crystal panel having a displaying portion and a non-displaying portion, said non-displaying portion being arranged at a peripheral portion of said displaying portion, said liquid crystal panel comprising an active matrix substrate having a light-intercepting layer and a driving circuit arranged at the non-displaying portion;
   a light source for irradiating the liquid crystal with a light through said active matrix substrate; and
   a heat-radiating plate located between the light source and the active matrix substrate, wherein said heat-radiating plate prevents the irradiation of said non-displaying portion with the light from said light source.

2. A liquid crystal display device according to claim 1, wherein said counter substrate has a color filter.

3. A liquid crystal display device according to claim 2, wherein said color filter is provided on the display portion of said counter substrate and an alignment mark layer is provided on the non-displaying portion of a counter substrate.

4. A liquid crystal device according to claim 3, wherein said color filters are arranged discretely with intervals, and the breadth of the color filter is larger than the breadth of an aperture region of a picture element.

5. A liquid crystal device according to claim 4, wherein the aperture region of the picture element is defined by a light-intercepting layer.

6. A liquid crystal display device according to claim 1, wherein a reflection-preventing layer is formed on a counter substrate.

7. A liquid crystal display device according to claim 1, wherein said active matrix substrate has a picture element-switching element comprising a thin film transistor arranged at the displaying portion.

8. A liquid crystal display device according to claim 1, wherein the active matrix substrate comprises an Si substrate.

9. A liquid crystal display device according to claim 8, wherein the peripheral driving circuit on the non-display region is constituted of a monocrystalline Si transistor.

* * * * *